US007398254B2

(12) United States Patent
Ueda et al.

(10) Patent No.: US 7,398,254 B2
(45) Date of Patent: Jul. 8, 2008

(54) COMPONENT COST ESTIMATION SYSTEM, COMPONENT COST ESTIMATION METHOD, COST STANDARD DATA PROVIDING SYSTEM, COST STANDARD DATA PROVIDING METHOD, RECORDING MEDIUM, AND COMPUTER DATA SIGNAL

(75) Inventors: Masayuki Ueda, Kanagawa (JP); Michikazu Sakurai, Saitama (JP); Manabu Ogishima, Kanagawa (JP); Tetsuya Miharada, Kanagawa (JP); Takaaki Katoh, Kanagawa (JP); Hiroyuki Shiratori, Tokyo (JP); Masatoshi Watanabe, Tokyo (JP); Yohichiroh Mukunoki, Tokyo (JP); Yoshio Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 864 days.

(21) Appl. No.: 10/029,270

(22) Filed: Dec. 28, 2001

(65) Prior Publication Data

US 2002/0087490 A1   Jul. 4, 2002

(30) Foreign Application Priority Data

Dec. 28, 2000   (JP)   ............... 2000-403520

(51) Int. Cl.
 *G06F 17/00* (2006.01)
 *G05B 13/02* (2006.01)
(52) U.S. Cl. ............... 705/400; 705/7; 700/36; 700/95
(58) Field of Classification Search ............... 705/400, 705/7
See application file for complete search history.

(56) References Cited

U.S. PATENT DOCUMENTS 4,827,508 A  *  5/1989  Shear ............... 705/53

(Continued)

FOREIGN PATENT DOCUMENTS

JP   5-136958   *   6/1993

(Continued)

OTHER PUBLICATIONS

"Cost Calculation with a Feature-based CAD System using Modules for Calculation, Comparison and Forecast", Journal of Engineering Design, vol. 10 No. 1 pp. 93-102, Mar. 1999, Leibl et al.*

(Continued)

*Primary Examiner*—John W. Hayes
*Assistant Examiner*—Rutao Wu
(74) *Attorney, Agent, or Firm*—Oblon, Spivak, McClelland, Maier & Neustadt, P.C.

(57) ABSTRACT

An external storage device of a component cost estimation system stores various cost information representing a component material and its cost in association with each other, and a component manufacturing step and a cost involved in the step in association with each other. An information processing apparatus specifies a material of a component to be manufactured, and a plurality of manufacturing steps. Then, the information processing apparatus retrieves a cost of the specified material, and costs corresponding to the specified manufacturing steps from the cost information, and estimates a cost of the component based on the retrieved costs. The cost of the component is computed by adding up the cost of the material and the costs involved in all the manufacturing steps.

16 Claims, 20 Drawing Sheets

U.S. PATENT DOCUMENTS

| | | | |
|---|---|---|---|
| 4,992,940 A * | 2/1991 | Dworkin | 705/26 |
| 5,189,606 A * | 2/1993 | Burns et al. | 705/10 |
| 5,249,120 A * | 9/1993 | Foley | 705/1 |
| 5,655,087 A * | 8/1997 | Hino et al. | 705/29 |
| 5,815,400 A * | 9/1998 | Hirai et al. | 700/173 |
| 5,970,476 A * | 10/1999 | Fahey | 705/28 |
| 6,047,274 A * | 4/2000 | Johnson et al. | 705/412 |
| 6,233,568 B1 * | 5/2001 | Kara | 705/410 |
| 6,775,647 B1 * | 8/2004 | Evans et al. | 703/7 |

FOREIGN PATENT DOCUMENTS

JP  7-282142  10/1995

OTHER PUBLICATIONS

Pending, U.S. Appl. No. 10/029,270, filed Dec. 28, 2001.
Pending, U.S. Appl. No. 10/212,687, filed Aug. 7, 2002.
U.S. Appl. No. 10/029,270, filed Dec. 28, 2001, Ueda et al.
U.S. Appl. No. 10/437,902, filed May 15, 2003, Sakurai et al.

* cited by examiner

FIG.2A

MATERIAL COST TABLE

| MATERIAL NAME | BOARD THICKNESS | UNIT PRICE | DETAILS OF EXPENSE | OTHERS |
|---|---|---|---|---|
| SECC-C-E16/E16 (ZINC STEEL PLATE) | 0.40 | 95.00 | PLATE EXPENSE 91.22 MANAGEMENT EXPENSE 3.78 | ..... |
| | 0.50 | 95.00 | ..... | ..... |
| | 0.60 | 94.00 | ..... | ..... |
| | ..... | ..... | ..... | ..... |
| AA1050P-H24 | 0.40 | 86.00 | ..... | ..... |
| | ..... | ..... | ..... | ..... |
| ..... | ..... | ..... | ..... | ..... |

FIG.2B

MANUFACTURING EQUIPMENT COST TABLE

| DEVICE NAME | PREPARATION TIME | PROCESSING TIME | UNIT PRICE/ HOUR |
|---|---|---|---|
| PRESS 90t | 0.1 | $1.3+0.1 \times L \times W \times T$ | ..... |
| ...... | ..... | ...... | ..... |
| MILLING MACHINE | 0.2 | $1.0+0.9 \times L \times W \times T$ | ..... |
| ...... | ..... | ...... | ..... |

FIG.3
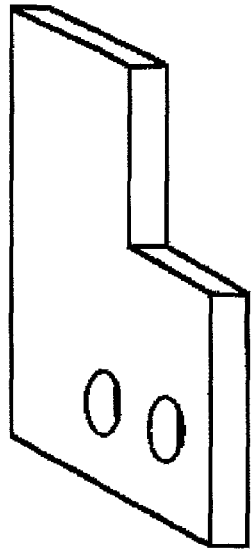
FORMING APPEARANCE
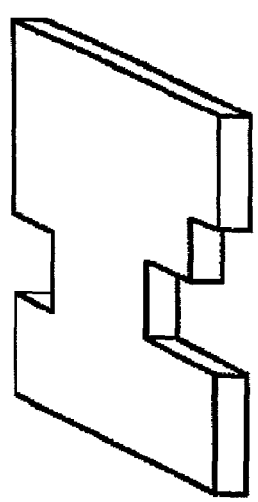
FORMING APPEARANCE PLUS PUNCHING
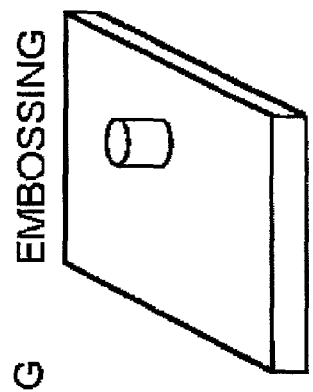
EMBOSSING
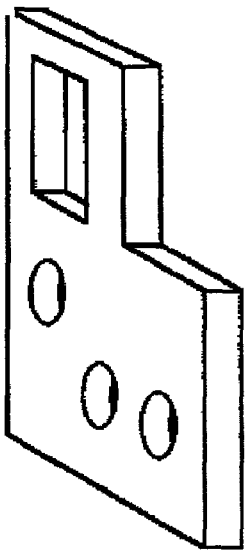
PUNCHING
ONE TYPE OF EMBOSSING
FORMING BOX SHAPE BY BENDING
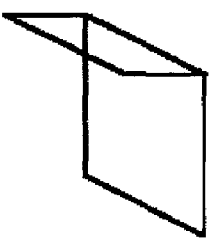
V-SHAPE BENDING

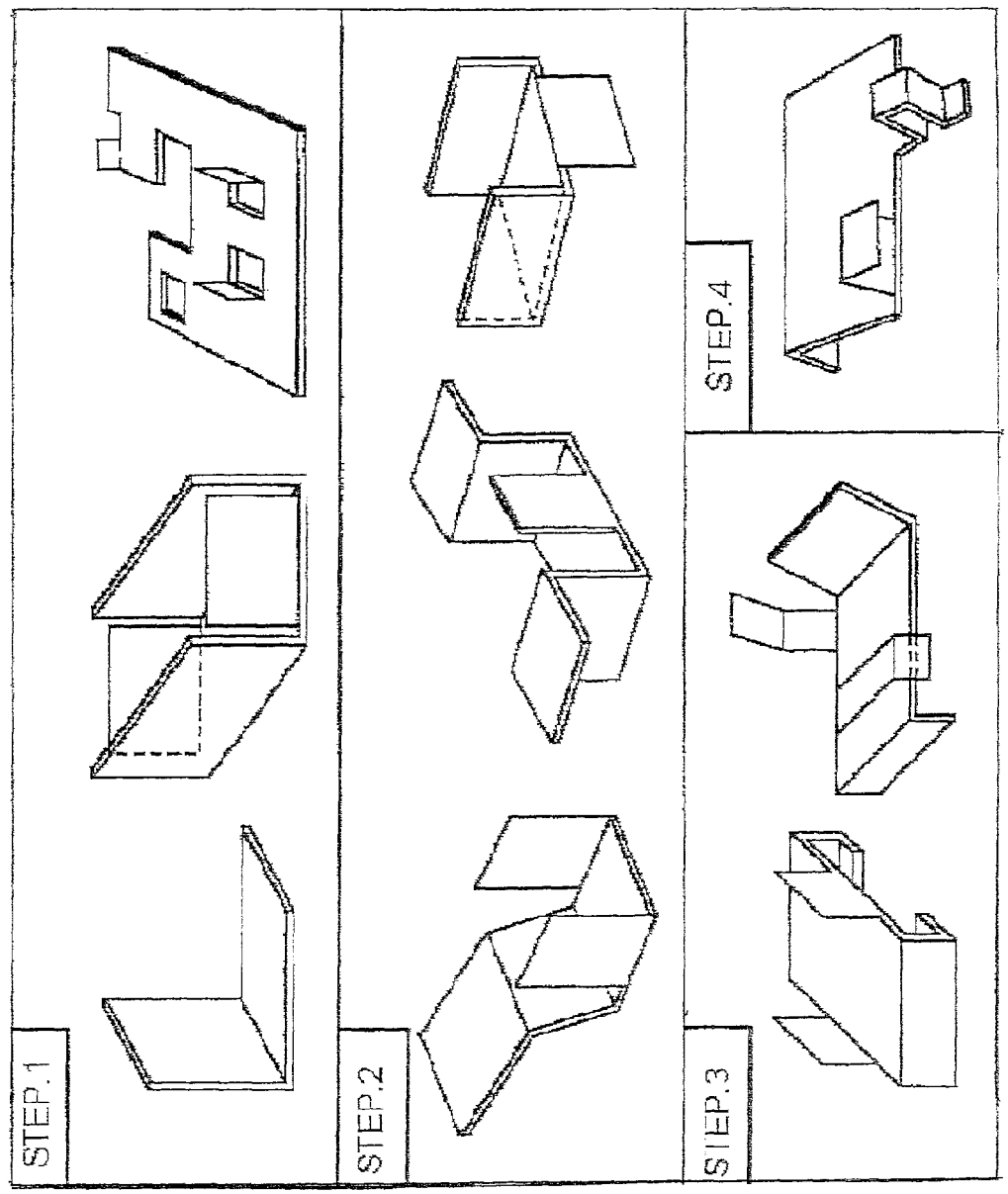

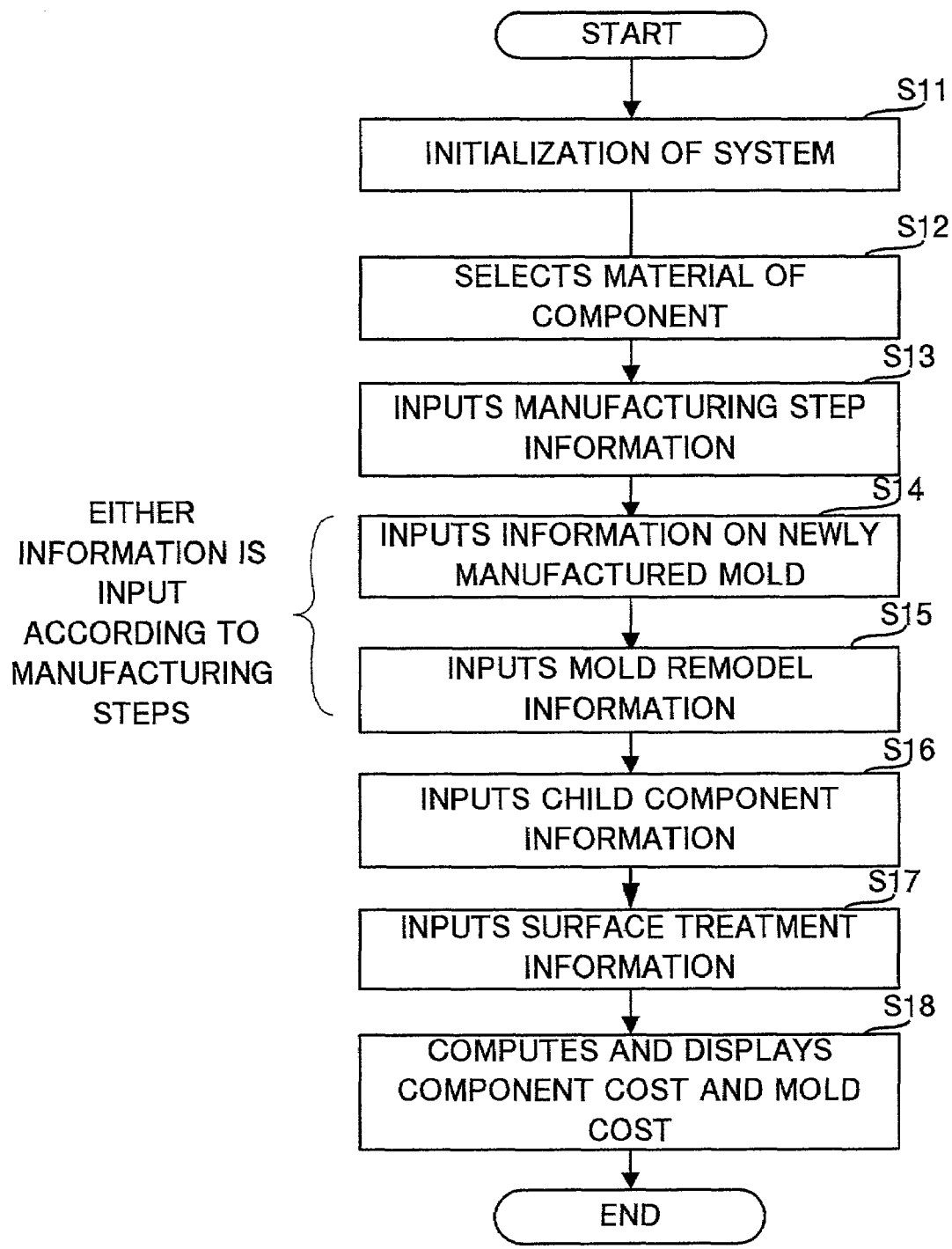

FIG. 6

PRESS [ ] SUFFIX [ ]

CODE NUMBER [ ]
KIND [ ] NAME OF COMPONENT [ ]

UNIT PRICE OF COMPONENT [ ] YEN
- MATERIAL EXPENSE [ ] YEN
- MANUFACTURING COST [ ] YEN
- OTHERS [ ] YEN (CHILD COMPONENT COST)
- PRIMARY MANUFACTURING COST [ ] YEN
- SECONDARY MANUFACTURING COST [ ] YEN

⟨MOLD COST DATA⟩
SUM TOTAL [ ] YEN   COMPUTATION OF SUM TOTAL  ○ NOT USE  ◉ TYPICAL MOLD  ◉ MASTER DIE SET TYPE MOLD

⟨BASIC DATA⟩
MONTHLY LOT [ ] LOTS/MONTH   TOTAL LOT [ ] LOTS
MATERIAL CODE [LIST] [ ]   MATERIAL NAME [ ] SPC  SE  BOARD THICKNESS [ ] mm
MATERIAL FORM [ ]   SECURE NUMBER [ ]
EXTEND LENGTH [ ] mm   EXTEND WIDTH [ ]   OUTER CIRCUMFERENCE LENGTH [ ] mm

⟨MANUFACTURING STEP INFORMATION⟩

| NO. | NAME OF MANUFACTURING STEP | DESIGNATED COST CENTER | MANUFACTURING COST | MOLD COST | REMODEL | |
|---|---|---|---|---|---|---|
| 1 | | | | | ▶ | |
| 2 | | | | | | |
| 3 | | | | | | |
| 4 | | | | | ◀ | |

☐ COMPONENT HARD TO HANDLE

[READ] [REGISTER] [COMPUTE] [ALL CLEAR] [ALL CLEAR] [COMPUTATION RESERVE]

[MENU]

- MANUFACTURING STEP INFORMATION
- CHILD COMPONENT INFORMATION
- PROCESSING COST INFORMATION
- COMPUTATION OF MATERIAL HANDLING COST
- LIST OF COMPONENTS FOR COST COMPUTATION
- LIST OF MOLDS FOR COST COMPUTATION

FIG.7

LIST OF MATERIALS

CLLASIFICATION BY MATERIAL NAME

A1050P-H54
A15654-986
A654-65908
A654-9864
C654987-79
·······
········
········
········
········
········
········

OK

CLASSIFICATION BY MATERIAL CHARACTERISTIC

SPC
AL
BL

FIG.8

| | LIST OF MATERIALS | | | | |
|---|---|---|---|---|---|
| CHARACTERISTIC OF MATERIAL | | | | | |

| NO. | MATERIAL NAME | BOARD THICKNESS | UNIT PLACE | SPECIFIC GRAVITY |
|---|---|---|---|---|
| 1 | DOK-v-g-b-/W-16(ZINC PLATE) | 0.4 | 95 | 7.886 |
| 2 | DOK-v-g-b-/W-16(ZINC PLATE) | 0.5 | 95 | 7.886 |
| 3 | DOK-v-g-b-/W-16(ZINC PLATE) | 0.6 | 90 | 7.886 |
| 4 | DOK-v-g-b-/W-16(ZINC PLATE) | 0.7 | 90 | 7.886 |
| 5 | DOK-v-g-b-/W-16(ZINC PLATE) | 0.8 | 85 | 7.886 |
| 6 | DOK-v-g-b-/W-16(ZINC PLATE) | 0.9 | 85 | 7.886 |
| 7 | DOK-v-g-b-/W-16(ZINC PLATE) | 1 | 80 | 7.886 |
| 8 | DOK-v-g-b-/W-16(ZINC PLATE) | 1.1 | 80 | 7.886 |
| 9 | DOK-v-g-b-/W-16(ZINC PLATE) | 1.2 | 75 | 7.886 |
| 10 | DOK-v-g-b-/W-16(ZINC PLATE) | 1.3 | 75 | 7.886 |
| 11 | DOK-v-g-b-/W-16(ZINC PLATE) | 1.4 | 70 | 7.886 |
| 12 | DOK-v-g-b-/W-16(ZINC PLATE) | 1.5 | 70 | 7.886 |

OK

CAN-CEL

MOLD REMODELING INFORMATION (BOX-SHARE BENDING/ STAIR-LIKE BENDING

| No. | TYPE OF REMODELING | NUMBER OF POINTS TO BE REMODELED |
|---|---|---|
| 1 | [STAIR-LIKE SHAPING] HEIGHTENING BENDING HEIGHT | 2 |

<REMODELING PATTERN>

○ [BOX-SHAPE BENDING] CHANGING BENDING HEIGHT OR CHANGING BENDING POSITION

⊙ [STAIR-LIKE BENDING] HEIGHTENING BENDING HEIGHT

○ [STAIR-LIKE BENDING] LOWERING BENDING HEIGHT

○ UNBENDING

2

| NEW | UPLOAD | DELETE |

FIG. 13

MOLD REMODELING INFORMATION (PUNCHING)

| No. | KIND OF HOLE | PUNCHING DIAMETER | NUMBER OF POINTS TO BE PUNCHED | TYPE OF REMODELING | DUPLI-CATION |
|---|---|---|---|---|---|
| No. | CIRCULAR HOLE | 5.00 | 1 | NEWLY ADDING HOLE | DUPLI-CATED |
| No. | CIRCULAR HOLE | 5.00 | 1 | CHANGING HOLE DIAMETER (LARGE→SMALL) | NON |

HOLE DIAMETER (SIZE AFTER REMODELING): 3.00

NUMBER OF POINTS TO BE PUNCHED: 1 POINT

⟨SHAPE OF HOLE⟩
○ RECTANGULAR HOLE
◉ CIRCULAR HOLE
○ PENTANGULAR HOLE

⟨REMODELING PATTERN⟩
○ NEWLY ADDING HOLE
◉ CHANGING HOLE DIAMETER
○ CHANGING HOLE POSITION LARGE→SMALL

○ HOLES DUPLICATED   ◉ NO DUPLICATION

[BACK] [CANCEL] [HELP]

[NEW] [UPLOAD] [DELETE]

FIG.14

PROCESSING COST INFORMATION

BACK
CANCEL
COMPUTE
HELP

UNIT PRICE OF COMPONENT  [0.00] YEN →   COMPUTED UNIT PRICE OF COMPONENT [0.00] YEN

PROCESSING COST [0.00] YEN →   COMPUTED PROCESSING COST [0.00] YEN

KIND OF SURFACE TREATMENT [chNi ▼]
- Ni
- Zn
- chNi
- ....

| | PRESS | |
|---|---|---|
| CODE NUMBER | | SUFFIX |
| KIND | NAME OF COMPONENT | GUIDING PLATE : SHEET DELIVERY : TOP | MENU |

UNIT PRICE OF COMPONENT [51.55] YEN
- MATERIAL EXPENSE [10.49] YEN
- MANUFACTURING COST [14.81] YEN
- OTHERS [10.86] YEN (CHILD COMPONENT COST)
- PRIMARY MANUFACTURING COST [0] YEN — MANUFACTURING STEP INFORMATION
- [10.81] YEN
- SECONDARY MANUFACTURING COST [0] YEN — CHILD COMPONENT INFORMATION

《MOLD COST DATA》
SUM TOTAL [174,561.56] YEN   COMPUTATION OF SUM TOTAL   ○NOT USE  ◎TYPICAL MOLD  ○MASTER DIE SET TYPE MOLD

《BASIC DATA》
- MONTHLY LOT [400] LOTS/MONTH   TOTAL LOT [1234] LOTS
- MATERIAL CODE [2P1] LIST   MATERIAL NAME [SPC]   SE   BOARD THICKNESS [ ] mm — PROCESSING COST INFORMATION
- MATERIAL FORM [PLATE MATERIAL]   SECURE NUMBER [1]
- EXTEND LENGTH [250] mm   EXTEND WIDTH [40]   OUTER CIRCUMFERENCE LENGTH [ ] mm — COMPUTATION OF MATERIAL HANDLING COST

《MANUFACTURING STEP INFORMATION》

| NO. | NAME OF MANUFACTURING STEP | DESIGNATED COST CENTER | MANUFACTURING COST | MOLD COST | REMODEL |
|---|---|---|---|---|---|
| 1 | APPEARANCE FORMING PLUS PUNCHING | PRESS90t | 4.85 | 764.88 | |
| 2 | BOX-SHAPE BENDING | PRESS80t | 6.76 | 654.265 | |
| 3 | BOX-SHAPE BENDING | PRESS70t | 6.76 | 564.321 | |
| 4 | BEAD | PRESS60t | 6.49 | 645.312 | |

— LIST OF COMPONENTS FOR COST COMPUTATION
— LIST OF MOLDS FOR COST COMPUTATION

☐ COMPONENT HARD TO HANDLE

[READ] [REGISTER] [COMPUTE] [ALL CLEAR] [ALL CLEAR] [COMPUTATION RESERVE]

FIG. 16

LIST OF PRESSING MOLDS FOR COST ESTIMATION

| ESTIMATED BY | TARO YAMADA | ESTIMATION DATE | 199/10/15 | ESTIMATION TIME | 16:01:26 |

PRESS

| CODE NUMBER | G123 | PRODUCTION BASE | JAPAN | NAME OF COMPONENT | |
| NAME OF MANUFACTURING STEP | BOX-SHAPE BENDING | MOLD TYPE | | | |

MOLD COST [ 100 ] YEN
- MATERIAL EXPENSE [ 200 ] YEN = TOTAL PLATE MATERIAL EXPENSE [ 100 ] YEN + TOTAL MATERIAL EXPENSE [ 100 ] YEN
- PROCESSING COST [ 200 ] YEN = QUENCHING COST [ 100 ] YEN + [ 100 ] YEN
- MANUFACTURING COST [ 300 ] YEN = COST FOR MANUFACTURING STEP [ 200 ] YEN + COST FOR CHANGING MANUFACTURING STEP [ 100 ] YEN
- DESIGN COST [ 400 ] YEN

| | NAME OF COMPONENT ELEMENT | CHARACTERISTIC OF MATERIAL | LENGTH | WIDTH | BOARD THICKNESS | MATERIAL EXPENSE | MATERIAL PROCESSING COST | MATERIAL COST (TOTAL) |
|---|---|---|---|---|---|---|---|---|
| 1 | | | | | | | | |
| 2 | TYPE OF BEAD | SS400 | 650 | 300 | 20 | 4,285 | 7,923 | 12,208 |
| 3 | PUNCH PLATE | ... | ... | ... | ... | ... | ... | ... |

| | NAME OF COST CENTER | PREPARATION TIME | PREPARATION COST | REQUIRED TIME | EQUIPMENT MANAGEMENT EXPENSE | REQUIRED STEP NUMBER | PERSONNEL EXPENSE | MATERIAL COST (TOTAL) |
|---|---|---|---|---|---|---|---|---|
| 1 | | | | | | | | |
| 2 | POLISHER | 100 | 200 | 0.99 | 250 | 0.55 | 0.26 | 3.523 |
| 3 | MILLING MACHINE | ... | ... | ... | ... | ... | ... | ... |

CLOSE
PREVIOUS PAGE
NEXT PAGE
PRINT

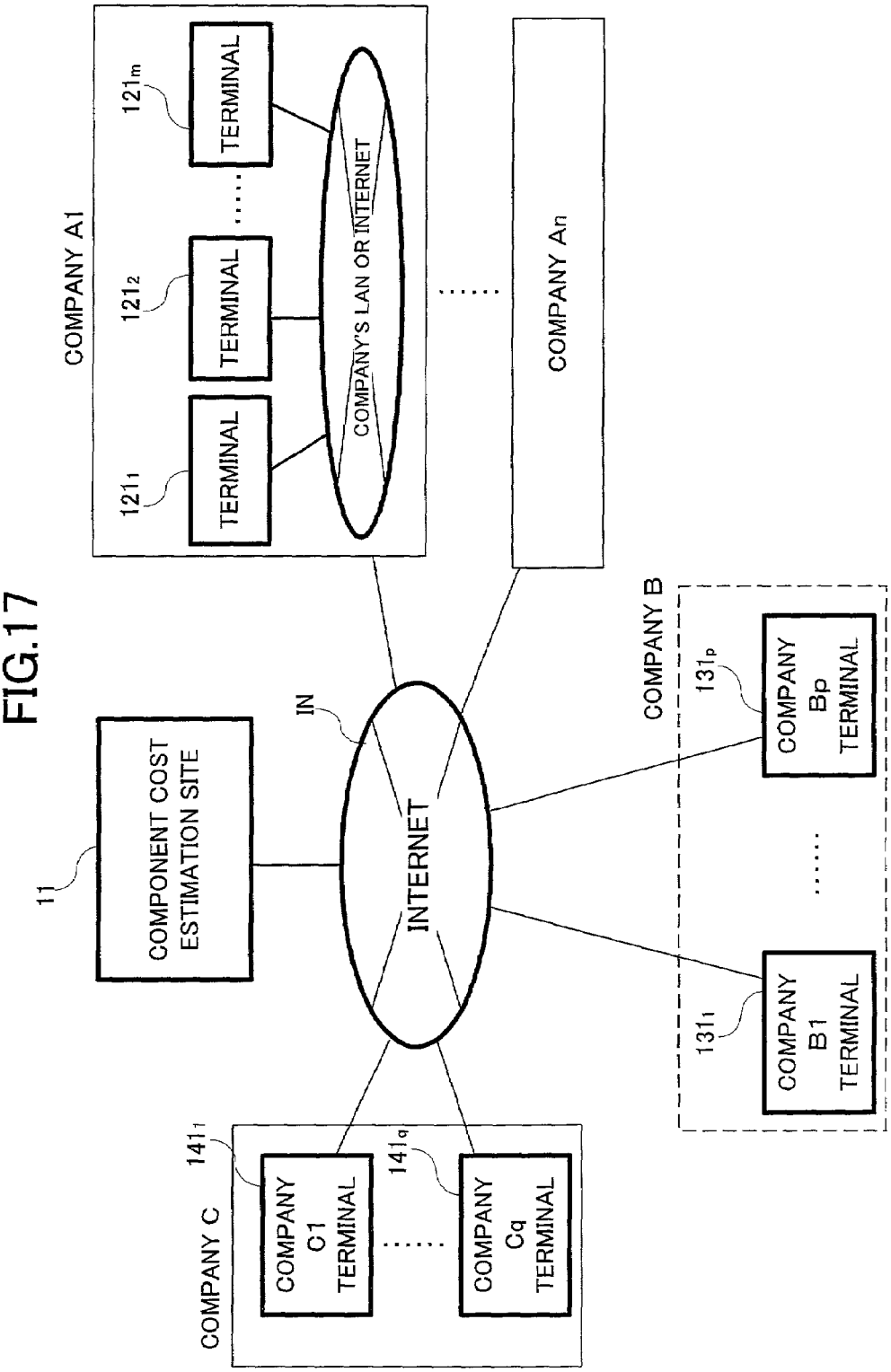

COMPONENT COST ESTIMATION SYSTEM, COMPONENT COST ESTIMATION METHOD, COST STANDARD DATA PROVIDING SYSTEM, COST STANDARD DATA PROVIDING METHOD, RECORDING MEDIUM, AND COMPUTER DATA SIGNAL

BACKGROUND OF THE INVENTION

1. Field of the Invention

The present invention relates to a system for estimating costs of components and molds, and a system for providing cost standard data.

2. Description of the Related Art

In industrial product manufacturing, engineers having expertise of component manufacturing have conventionally been in charge of estimation of production costs required for manufacturing components and molds for manufacturing components.

A system utilizing a computer has recently been introduced for cost estimation, and those who are not so familiar with component manufacturing have become able to fulfil cost estimation on their own.

For example, the cost estimation method disclosed in Unexamined Japanese Patent Application KOKAI Publication No. H7-282142, is a method in which processes from extraction of to-be manufactured components to computation of estimated costs are automated. According to this method, the shape of a cost-estimation-target sheet metal product is recognized using pre-set cross-sectional shape data, based on drawings of the metal sheet product. Based on the recognized cross-sectional shape of the sheet metal product, the manufacturing steps of the sheet metal product are specified, and costs involved in the manufacturing steps and costs required for estimation are computed.

However, the logical computation manner of the cost estimation method disclosed in Unexamined Japanese Patent Application KOKAI Publication No. H7-282142 is not suitable for estimating a cost of a mold, resulting in too rough estimation of the cost of the mold.

In case of using an existing mold which has been remodeled by design change, cost estimation for such a mold requires overall change of settings.

Further, estimation data acquired by workers belonging to other sections cannot be utilized for estimation.

And component manufacturers do not have means to know whether their goods are manufactured at a satisfactory cost level or not when compared to the industry's standard, or to know to what extent they should reduce the manufacturing costs while keeping the quality.

SUMMARY OF THE INVENTION

The present invention was made in view of the above circumstances, and it is an object of the present invention to provide a cost estimation system and method by which specific estimation for a component cost and a mold cost can be obtained.

It is another object of the present invention to provide a cost estimation system and method capable of simplified estimation in case of changing the design of a mold.

It is still another object of the present invention to provide a cost estimation system and method capable of cost estimation with the use of estimation data acquired by others.

It is yet another object of the present invention to provide a cost estimation system and method which enable component manufacturers to become objective to their own cost levels, and to set a goal to be achieved by effort.

To accomplish the above objects, a component cost estimation system according to a first aspect of the present invention is a system for estimating a cost of a component, the system comprising: a memory which stores cost information for associating a material of a component, a cost of the material, manufacturing steps of the component, and costs involved in the manufacturing steps with one another; and a computer, wherein the computer:

receives data for designating a material of a component to be manufactured, and manufacturing steps to be applied to the material;

retrieves a cost associated with the designated material, and costs associated with the designated manufacturing steps from the cost information; and generates data representing a result of estimation of a cost of the designated component based on each of the retrieved costs.

According to this structure, a cost corresponding to the material and costs corresponding to the manufacturing steps are retrieved from the cost information, and a cost of the component is obtained based on the retrieved costs. Therefore, the total cost of the component can be obtained relatively appropriately.

The cost information may include information associating the manufacturing steps, devices used in the manufacturing steps, and costs involved in using the devices with one another.

In this case, the computer may:

receive data for designating the material, the manufacturing steps, and the devices used in the manufacturing steps;

retrieve costs associated with the designated material and the designated devices from the cost information; and determine a result of estimation based on a sum of the retrieved costs.

The cost information may include information associating the manufacturing steps and costs of child components which are the components to be used in the manufacturing steps with each other.

The manufacturing steps may include a pressing process.

The cost information may include information associating a pressing device to be used in the pressing process and a cost involved in using the pressing device with each other.

The computer may;

receive data for designating the pressing process, a material to which the pressing process is applied, and the pressing device to be used in the pressing process;

retrieve costs associated with the designated material and the designated pressing device from the cost information; and determine a result of estimation based on a sum of the retrieved costs.

The computer may obtain costs of molds to be used in steps included in the pressing process, and use the obtained costs as costs retrieved from the cost information.

In this case, it is preferable that the computer obtains the costs of the molds which are to be used in the respective steps included in the pressing process, and which are either newly manufactured, or manufactured by remodeling an existing mold.

The memory may store the cost information associated with each region engaging in manufacturing the component.

In this case, the computer may:

receive data for designating a region engaging in manufacturing the component; and determine a result of estimation of the cost of the component based on costs retrieved from the cost information associated with the designated region.

The computer may be ready to receive designation to a part of the plurality of manufacturing steps.

In this case, the computer may determine a result of estimation of the cost of the component by considering predetermined standard manufacturing steps to be designated in stead of the manufacturing steps other than the designated manufacturing step.

The component cost estimation system may further comprise a reception server which receives an access from outside via a network, and sends the data representing the result of estimation of the cost of the component obtained by the computer to an accesser. This structure of the system may be realized by employing a client-server-type system, an ASP (Application Service Provider) system, or the like.

To accomplish the above objects, a component cost estimation system according to a second aspect of the present invention is a system which receives accesses from a plurality of working bodies via a network, and estimates a cost of a component, the system comprising:

a memory which stores cost information for associating a material of a component to be manufactured, a cost of the material, manufacturing steps to be applied to the material, and costs involved in the manufacturing steps with one another;

a reception server which receives designation data for designating the material of the component and the manufacturing steps to be applied to the material from the working bodies who request an estimation via the network; and an estimation computer, wherein the estimation computer:

retrieves costs associated with the material and manufacturing steps designated by the designation data received by the reception server from the cost information;

generates estimation result data representing a result of estimation of a cost of the component based on the retrieved costs; and sends the estimation result data to the working bodies who have requested the estimation via the network.

The reception server may receive a browsing request for browsing a content of the cost information.

In this case, the estimation computer may send the content of the cost information to a sender of the browsing request via the network in response to the browsing request received by the reception server.

The component cost estimation system may further comprise a verification data memory which stores verification data for verifying the working bodies.

In this case, the reception server may:

receive verification data sent from the working bodies via the network; and determine whether or not to receive the designation data from the working bodies based on the verification data sent from the working bodies and the verification data stored in the verification data memory, and refuse to receive the designation data when determined not to receive the designation data.

The cost information may be made up of information obtained based on a cost of a component provided by a working body selected according to a predetermined standard from among a plurality of working bodies who provide substantially the same component.

Specifically, the working body to be selected is a company having a largest or second largest share in a specific industry. The cost information which is based on a cost achieved by such a company may represent a level which can be achieved by other working bodies with rational efforts.

To accomplish the above objects, a cost standard information providing system according to a third aspect of the present invention comprises:

a memory which stores a standard value of a cost of a component, the standard value being obtained by collecting and analyzing information on the component provided by a plurality of working bodies;

a request reception server which receives via a network, a provision request for requesting the standard value to be provided;

an information providing server which provides via the network, the standard value stored in the memory in response to the provision request received by the request reception server.

According to this system, a standard value which is obtained based on a cost of a given component collected in an actual survey and including a material cost, a manufacturing cost, an equipment cost, etc. is provided on demand. This standard value is an objective value. Component providers such as component manufacturers receive the standard value, and can improve their business by finding out a point to be improved while referring to the received standard value.

The standard value may represent a cost level which can be achieved with a predetermined effort to be made by a working body who satisfies a predetermined standard in each component field.

The standard value may be set for each material of the component, and for each manufacturing step.

To accomplish the above objects, a component cost estimation method according to a fourth aspect of the present invention is a method for estimating a cost of a component, comprising the steps of:

storing cost information for associating a material of a component, a cost of the material, manufacturing steps of the component, and costs involved in the manufacturing steps;

receiving data for designating a material of a component to be manufactured, and manufacturing steps to be applied to the designated material;

retrieving a cost associated with the designated material, and costs associated with the designated manufacturing steps from the cost information; and generating data representing a result of estimation of a cost of the component based on the retrieved costs.

To accomplish the above objects, a component cost estimation method according to a fifth aspect of the present invention is a method for receiving accesses from a plurality of working bodies via a network, and estimating a cost of a component, the method comprising the steps of:

storing cost information for associating a material of a component to be manufactured, a cost of the material, manufacturing steps to be applied to the material, and costs involved in the manufacturing steps with one another;

receiving designation data for designating the material of the component and the manufacturing steps to be applied to the material from the working bodies who request an estimation via the network;

retrieving costs associated with the material and manufacturing steps designated by the received designation data from the cost information;

generating estimation result data representing a result of estimation of a cost of the component based on the retrieved costs; and sending the estimation result data to the working bodies who have requested the estimation via the network.

To accomplish the above objects, a cost standard information providing method according to a sixth aspect of the present invention comprises the steps of:

storing a standard value of a cost of a component, the standard value being obtained by collecting and analyzing information on the component provided by a plurality of working bodies;

receiving via a network, a provision request for requesting the standard value to be provided; and providing via the network, the stored standard value in response to the received provision request.

To accomplish the above objects, a computer-readable recording medium according to a seventh aspect of the present invention stores a program for controlling a computer, which is connected to a memory for storing cost information associating a material of a component, a cost of the material, manufacturing steps of the component, and costs involved in the manufacturing steps with one another, to perform the steps of:

receiving data for designating a material of a component to be manufactured and manufacturing steps to be applied to the material;

retrieving a cost associated with the designated material, and costs associated with the designated manufacturing steps from the cost information; and generating data representing a result of estimation of a cost of the component based on the retrieved costs.

To accomplish the above objects, a computer-readable recording medium according to an eighth aspect of the present invention stores a program for controlling a computer, which is connected to a reception server for receiving designation data for designating a material of a component to be manufactured and manufacturing steps to be applied to the material from a plurality of working bodies who request an estimation via a network, and is also connected to a memory for storing cost information for associating a material of a component, a cost of the material, manufacturing steps of the component, and costs involved in the manufacturing steps with one another, to perform the steps of:

retrieving costs associated with the material and manufacturing steps designated by the designation data received by the reception server from the cost information;

generating estimation result data representing a result of estimation of a cost of the component based on the retrieved costs; and sending the estimation result data to the working bodies who have requested the estimation via the network.

To accomplish the above objects, a computer-readable recording medium according to a ninth aspect of the present invention stores a program for controlling a computer, which comprises a memory for storing a standard value of a cost of a component obtained by collecting and analyzing information on the component provided by a plurality of working bodies, to perform the steps of:

receiving via a network, a provision request for requesting the standard value to be provided; and providing via the network, the standard value stored in the memory in response to the received provision request.

A program for controlling a computer to function as a system having the above-described functions or for controlling a computer to perform the above-described steps may be stored in a computer-readable recording medium to be distributed.

To accomplish the above objects, a computer data signal according to a tenth aspect of the present invention is embedded in a carrier wave, and represents a program for controlling a computer, which is connected to a memory for storing cost information for associating a material of a component, a cost of the material, manufacturing steps of the component, and costs involved in the manufacturing steps with one another, to perform the steps of:

receiving data for designating a material of a component to be manufactured and manufacturing steps to be applied to the material;

retrieving a cost associated with the designated material and costs associated with the designated manufacturing steps from the cost information; and generating data representing a result of estimation of a cost of the component based on the retrieved costs.

To accomplish the above objects, a computer data signal according to an eleventh aspect of the present invention is embedded in a carrier wave, and represents a program for controlling a computer, which is connected to a reception server for receiving designation data for designating a material of a component to be manufactured and manufacturing steps to be applied to the material from a plurality of working bodies who request an estimation via a network, and is also connected to a memory for storing cost information for associating a material of a component, a cost of the material, manufacturing steps of the component, and costs involved in the manufacturing steps with one another, to perform the steps of:

retrieving costs associated with the material and manufacturing steps designated by the designation data received by the reception server from the cost information;

generating estimation result data representing a result of estimation of a cost of the component based on the retrieved costs; and sending the estimation result data to the working bodies who have requested the estimation via the network.

To accomplish the above objects, a computer data signal according to a twelfth aspect of the present invention is embedded in a carrier wave, and represents a program for controlling a computer, which comprises a memory for storing a standard value of a cost of a component obtained by collecting and analyzing information on the component provided by a plurality of working bodies, to perform the steps of:

receiving via a network, a provision request for requesting the standard value to be provided; and providing via the network, the standard value stored in the memory in response to the received provision request.

The above-described programs may be presented on a Bulletin Board System on a communication network to be distributed on the communication network. Or, carrier waves may be modulated by signals representing the above-described programs, and obtained modulated waves may be transmitted. Devices which receive the modulated waves may restore the programs by demodulating the modulated waves.

BRIEF DESCRIPTION OF THE DRAWINGS

These objects and other objects and advantages of the present invention will become more apparent upon reading of the following detailed description and the accompanying drawings in which:

FIGS. 2A and 2B are diagrams showing examples of cost tables;

FIG. 3 is a diagram illustrating examples of process methods applied to materials;

FIG. 4 is a diagram illustrating examples of process methods applied to materials;

FIG. 5 is a flowchart for explaining a flow of a cost estimation process;

FIG. 6 is a diagram exemplifying an input screen displayed on an information processing apparatus;

FIG. 7 is a diagram exemplifying a material condition input screen;

FIG. 8 is a diagram exemplifying a screen on which a list of materials is displayed;

FIG. 10 is a diagram exemplifying a screen on which information on a new mold is input;

FIG. 12 is a diagram exemplifying a screen on which information on remodel of an existing mold is input;

FIG. 13 is a diagram exemplifying a screen on which information on remodel of an existing mold is input;

FIG. 14 is a diagram exemplifying a screen on which information on surface treatment is input;

FIG. 15 is a diagram exemplifying a screen on which a cost estimation result is displayed;

FIG. 16 is a diagram exemplifying a screen on which a cost estimation result for a press model (mold) is displayed;

FIG. 17 is a diagram showing a structure of a component cost estimation system according to a second embodiment of the present invention;

DETAILED DESCRIPTION OF THE PREFERRED EMBODIMENTS

First Embodiment

A cost estimation system according to a first embodiment of the present invention will now be explained. In this explanation, a system for estimating a cost of a pressed component (a component manufactured by pressing) will be employed as an example.

Figure 1:
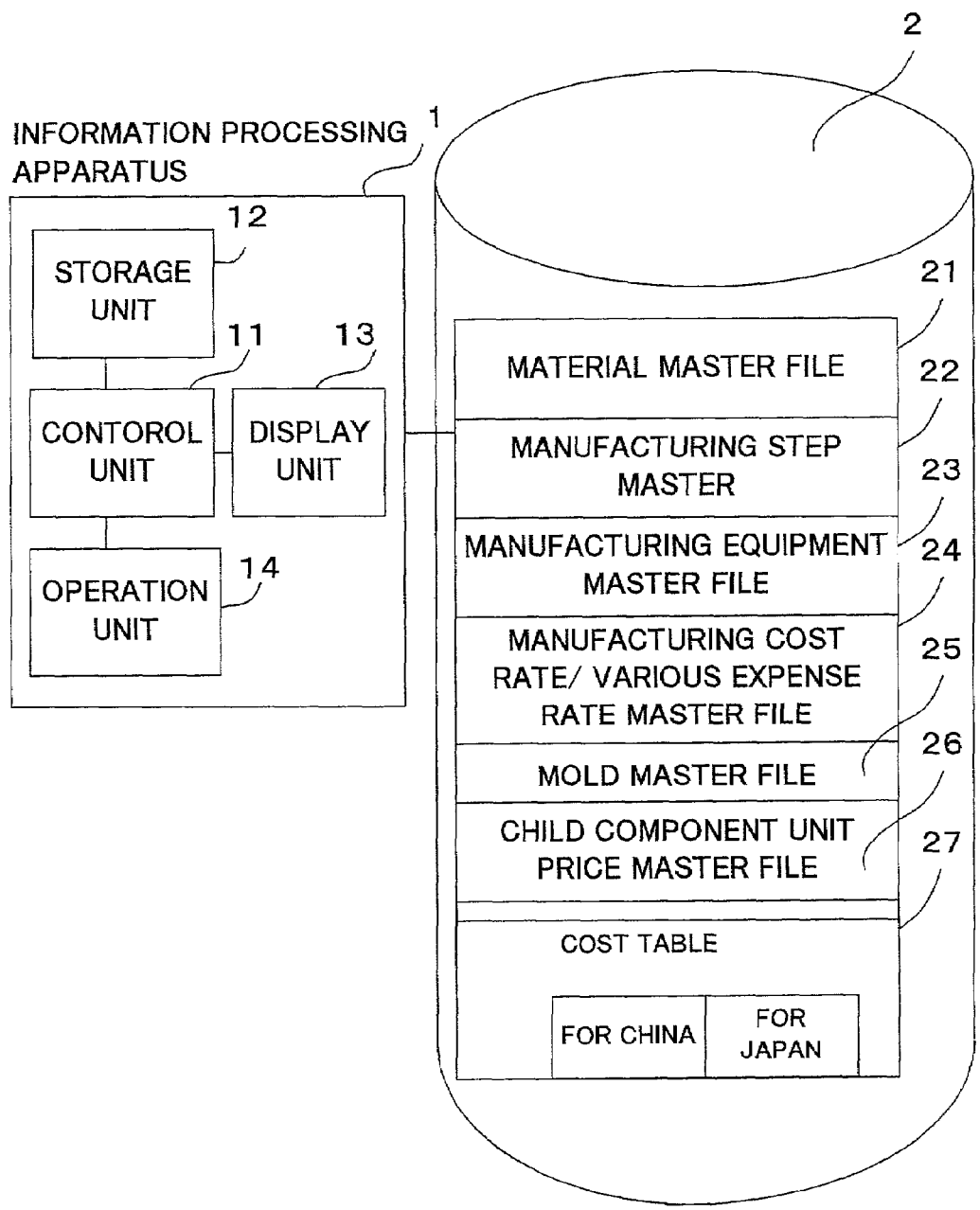
FIG. 1 is a block diagram showing a structure of a component cost estimation system according to a first embodiment of the present invention.

FIG. 1 is a block diagram showing the structure of the cost estimation system according to the first embodiment of the present invention.

This cost estimation system is set in a working section which requires estimation of component costs. Such a working section includes a materials procurement section, a design section, etc. of a company. This cost estimation system comprises one or more information processing apparatuses 1, and an external storage device 2.

The information processing apparatus 1 comprises a control unit 11, a storage unit 12 which is connected to the control unit 11, a display unit 13, and an operation unit 14.

The control unit 11 comprises a CPU (Central Processing Unit) for example. The storage unit 12 comprises a RAM (Random Access Memory), a hard disk device, or the like, for example. The display unit 13 comprises a CRT (Cathode Ray Tube) for example. The operation unit 14 comprises a keyboard, a mouse, and the like, for example. The information processing apparatus 1 acts as a computer.

The external storage device 2 is connected directly or via a network such as a LAN (Local Area Network) to the information processing apparatus 1. The external storage device 2 comprises a hard disk device for example. The external storage device 2 stores information called "cost information" which regards costs involved in manufacturing or additional processing of a component. The cost information includes a material master file 21, a manufacturing step master file 22, a manufacturing equipment master file 23, a manufacturing cost rate/various expense rate master file 24, a mold master file 25, a child component unit price master file 26, a cost table 27, a cost guideline 28, an estimation data file 29. The storage unit 12 of the information processing apparatus 1 may act as the external storage device 2.

The material master file 21 is for storing specifications of components, and specifications of various materials used for manufacturing products.

The manufacturing step master file 22 is for storing kinds and contents of manufacturing steps applied to materials (information such as which device is employable, how long time is necessary, etc.).

The manufacturing equipment master file 23 is for storing a list of various equipments employable in manufacturing, and a list of specifications of those equipments (such as how long time is necessary to manufacture things with those equipments). Those equipments include, for example, a machining center, a drilling machine, a surface grinding machine, a milling machine, a molding grinding machine, etc.

The manufacturing cost rate/various expense rate master file 24 is for storing manufacturing cost rates, and rates of various expenses. A manufacturing cost rate represents a cost required for driving an equipment per unit time (yen/time). The manufacturing cost rate is a coefficient used for computing a manufacturing cost based on time required for driving an equipment, and is set for each equipment.

The rates of various expenses are coefficients used for including indirect expenses proportionately into the total manufacturing costs. The rates of various expenses include a general management/sales expense rate and a material management expense rate. The general management/sales expense rate is a coefficient used for including a general management/sales expense into the total manufacturing cost of a component. The general management/sale expense is obtained by multiplying the manufacturing cost by the general management/sales expense rate. The material management expense rate is a coefficient used for including a material management expense for managing inventories of various materials, into the total manufacturing cost of a product. The material management expense is obtained by multiplying the material expense by the material management expense rate.

The mold master file 25 is for storing information on molds and specifications of the molds.

The child component unit price master file 26 is for storing so-called child components used in pressing processes in association with respective unit prices.

The cost table 27 is the integration of the material master file 21 to the child component unit price master file 26. The cost table 27 is a table showing correspondence between materials used in pressing processes and costs of the materials, and correspondence between each manufacturing step and the cost involved in each step.

The cost table 27 is prepared by integrating the material master file 21 to the child component unit price master file 26 with a focus narrowed on cost estimation purpose. Therefore, the cost table 27 is not an indispensable item. However, FIG. 1 shows the cost table 27 with a view to clarifying features of the present invention, and facilitating the understanding of the overall system.

Specifically, the cost table 27 includes a cost table for materials to be used for component manufacturing, and a cost table for manufacturing equipments (devices), respectively called a "material cost table" and a "manufacturing equipment cost table".

The contents of the above-explained files are set by analyzing data of material expenses and manufacturing costs collected in cooperation with component manufacturers. Those contents should include target figures which can be accomplished by a predetermined number of companies ranking high in the component manufacturing (providing) industry with rational corporate efforts. The predetermined number of highly ranking companies may be such companies as having the largest or second largest shares in the industry. The figures (or expressions) set in the cost table 27 are achievement targets for medium-sized component manufacturers.

Costs involved in component manufacturing greatly vary in accordance with countries or regions engaging in component manufacturing. And supplied equipments are also different from region to region. Thus, the above files are prepared for each country engaging in component manufacturing (in FIG. 1, prepared for Japan and China).

FIG. 2A shows an example of the cost table for materials to be used for manufacturing components which require pressing. As shown in FIG. 2A, materials are classified by material name, board thickness, unit price, specific gravity, etc. For example, in order to employ a zinc steel plate having a thickness of 0.8 mm (SECC-C-E16/E16) for manufacturing a component, the unit price of the material expense can be obtained by selecting the material having the required specifications from the list. In a case where a plurality of (for example, "N") components can be manufactured out of one material, the material cost for each component is 1/N of the unit price.

As outlined in FIG. 3, pressing processes include: (1) forming a material into a desired appearance with the use of a mold; (2) punching a hole in a material; (3) combination of appearance forming (1) and punching (2); (4) embossing a material partially; (5) bending one or more sides of a material; and (6) forming a material into a box shape by bending.

The bending press includes various kinds as shown in FIG. 4. The respective kinds have their own number of process steps. Pressing devices used for manufacturing are differently selected in accordance with material kinds or bending kinds. And values of load for pressing are also differently set. Thus, the manufacturing equipment cost table shown in FIG. 2B stores costs device by device (or load by load).

The cost guideline 28 stores data acquired in the process of generating the cost table 27 in the form of text, drawing, and table. Specifically, the data collected from component manufacturers, analyzing methods for the collected data, standard figures or data of several top companies acquired by the analyses, grounds used for deducing target figures (set in the cost table 27) from those data, and the like are stored.

The estimation data file 29 is for storing estimation data acquired in the past.

A cost estimation process performed by the cost estimation system will now be explained below with reference to the flowchart shown in FIG. 5.

The information processing apparatus 1 is initialized (step S11). In this step S11, the information processing apparatus 1 acquires information on various materials used for manufacturing components or products from the material master file 21. The information processing apparatus 1 acquires information on kinds and contents of manufacturing steps (information regarding which device is employable, how long time is required, etc.) from the manufacturing step master file 22. The information processing apparatus 1 acquires information on various employable equipments such as a machining center, a drilling machine, a surface grinding machine, a milling machine, a molding grinding machine, etc. from the manufacturing equipment master file 23. The information processing apparatus 1 acquires manufacturing cost rates from the manufacturing cost rate/various expense rate master file 24. The information processing apparatus 1 acquires information on existing molds from the mold master file 25. The information processing apparatus 1 acquires information on child components from the child component unit price master file 26. The information processing apparatus reads the cost table 27.

Further, the information processing apparatus 1 displays an initial main screen for setting as shown in FIG. 6 on the display unit 13.

An operator of the information processing apparatus 1 sets an estimation number. Or, in a case where the operator uses the past estimation, the operator needs to click a button such as "read". In this case, the information processing apparatus 1 reads the past estimation data stored in the estimation data file 29 for re-use in response to the click of the button.

The operator (or estimation worker) selects a material of a component on the main screen shown in FIG. 6 (step S12). Specifically, in step S12, the operator selects or sets a code of a desired component material, the form of the material, the name of the material, the board thickness and the like. As a result, the operator can obtain information of the material, such as the specific gravity, the price per unit volume, and the like. And the operator inputs manufacturing conditions. Specifically, the operator inputs the material form, a manufacturing lot number for the component, extend dimensions (measures of a three-dimensional component when it is developed), and the like.

The information processing apparatus 1 has various input support functions in order to make the input operation easier. For example, when the operator clicks a "list" button provided beside the item "material code", the information processing apparatus 1 displays a material condition input screen as shown in FIG. 7. The operator inputs search conditions from this screen, and clicks an "OK" button. Then, the information processing apparatus 1 retrieves materials which correspond to the input search conditions from the material master file 21, and displays a list of materials retrieved as shown in FIG. 8. The operator selects an arbitrary material from the list by clicking. Then, values of the size, the weight, the specific gravity, etc. of the selected material are set in boxes in which the respective values are to be input. The operator can directly input values in those boxes.

Further, the operator inputs manufacturing conditions. Specifically, the operator inputs a manufacturing lot number for the component, extend length, extend width, outer circumference length, etc. The information processing apparatus 1 automatically determines how many of the component can be secured out of one material based on the input extend dimensions. Then, the information processing apparatus 1 sets a value obtained by determination in an item "secure number" shown in FIG. 6.

Then, the operator inputs manufacturing step information from the initial main screen shown in FIG. 6 (step S13). The manufacturing step information is information regarding manufacturing (processing) steps. Specifically, the manufacturing step information includes names of steps, such as appearance forming, punching, box-shape bending, bending, etc. The operator selects those step names and inputs the names in an item "manufacturing step information" shown in FIG. 6 according to a manufacturing order. Or, the operator can input the manufacturing step information by referring to the manufacturing step master file 22 and selecting manufacturing step names from a list of manufacturing steps.

When manufacturing step names are input, the information processing apparatus 1 refers to the manufacturing step master file 22 and the manufacturing equipment master file 23, and automatically selects a suitable manufacturing equipment for each manufacturing step. When a plurality of candidate equipments can be obtained, the information processing apparatus 1 displays a pre-set recommended device. However, in a case where an instruction from the operator is received, a device corresponding to this instruction may be selected.

Then, the operator inputs information regarding a mold to be newly manufactured and used in each step (step S14). In step S14, the operator inputs the mold information according to an input guide displayed by the information processing apparatus 1. The mold information includes the length, width, etc. of the component, number of points to be processed, and the like.

Materials of molds and costs required in mold manufacturing steps vary in accordance with contents of process methods applied to materials. Thus, there is a need to specify contents of process methods to be employed to manufacture the mold whose information has been input. To specify the contents of process methods, the information processing apparatus 1 displays a reference screen shown in FIG. 9 or in FIG. 10, and receives the contents (kinds of process methods, size, number, etc.) of process methods to be employed to manufacture the mold, when those are input by the operator.

Figure 9:
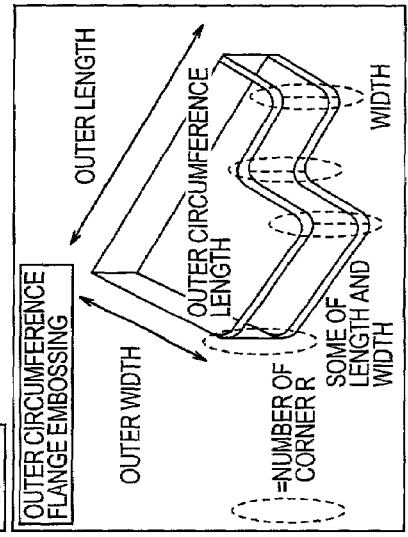
FIG. 9 is a diagram exemplifying a screen on which information on a new mold is input.
Figure 10:
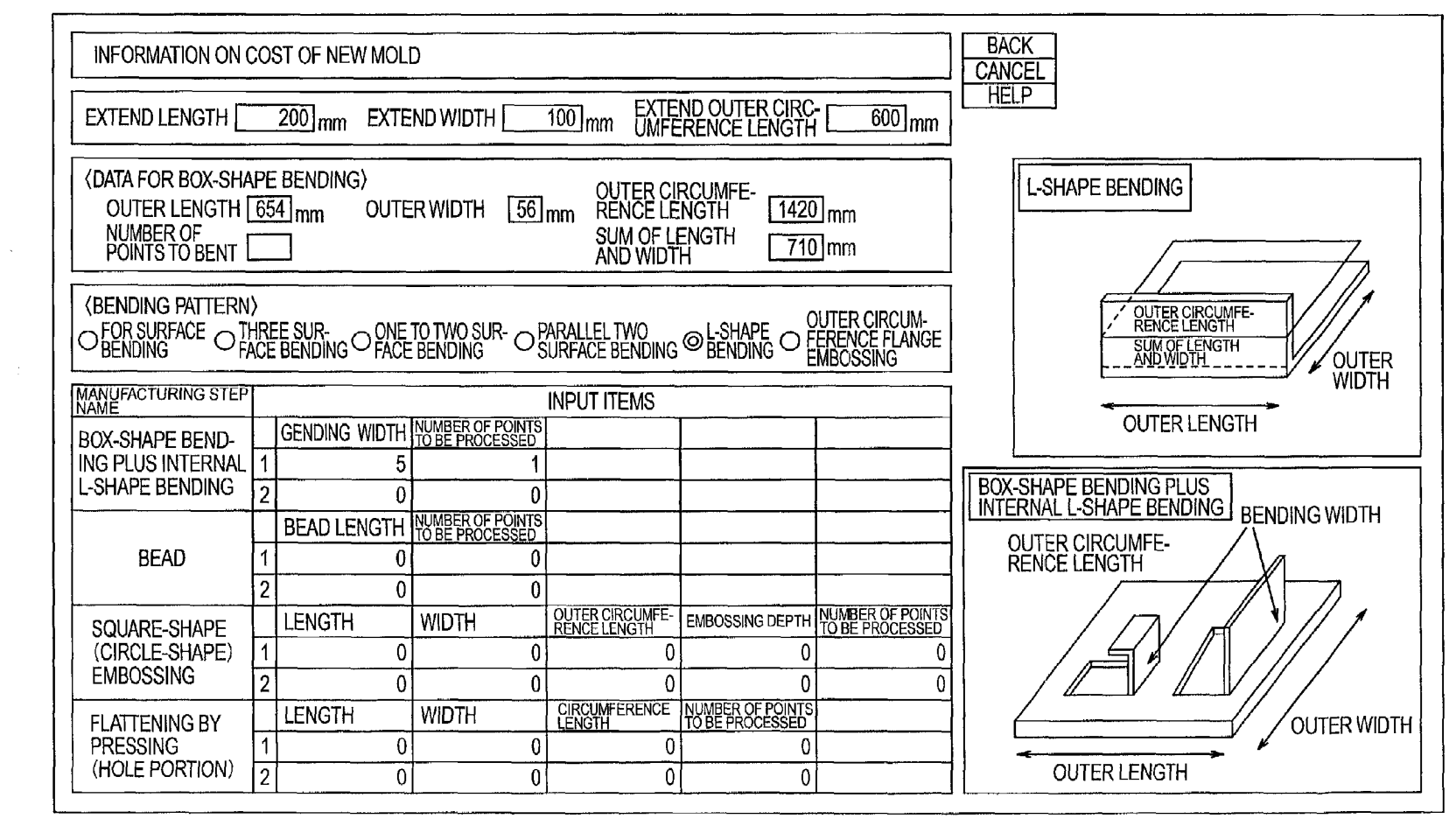

Kinds of process methods include box-shape bending plus internal L-shape bending, bead embossing, square-shape (circle-shape) embossing, flattening by pressing (hole portion), flattening by pressing (edge portion), etc. as exemplified in FIG. 9 and FIG. 10. The operator inputs information such as bending widths, number of points to be processed, lengths and depths of portions to be processed, etc. in accordance with the contents of the process methods.

Figure 11:
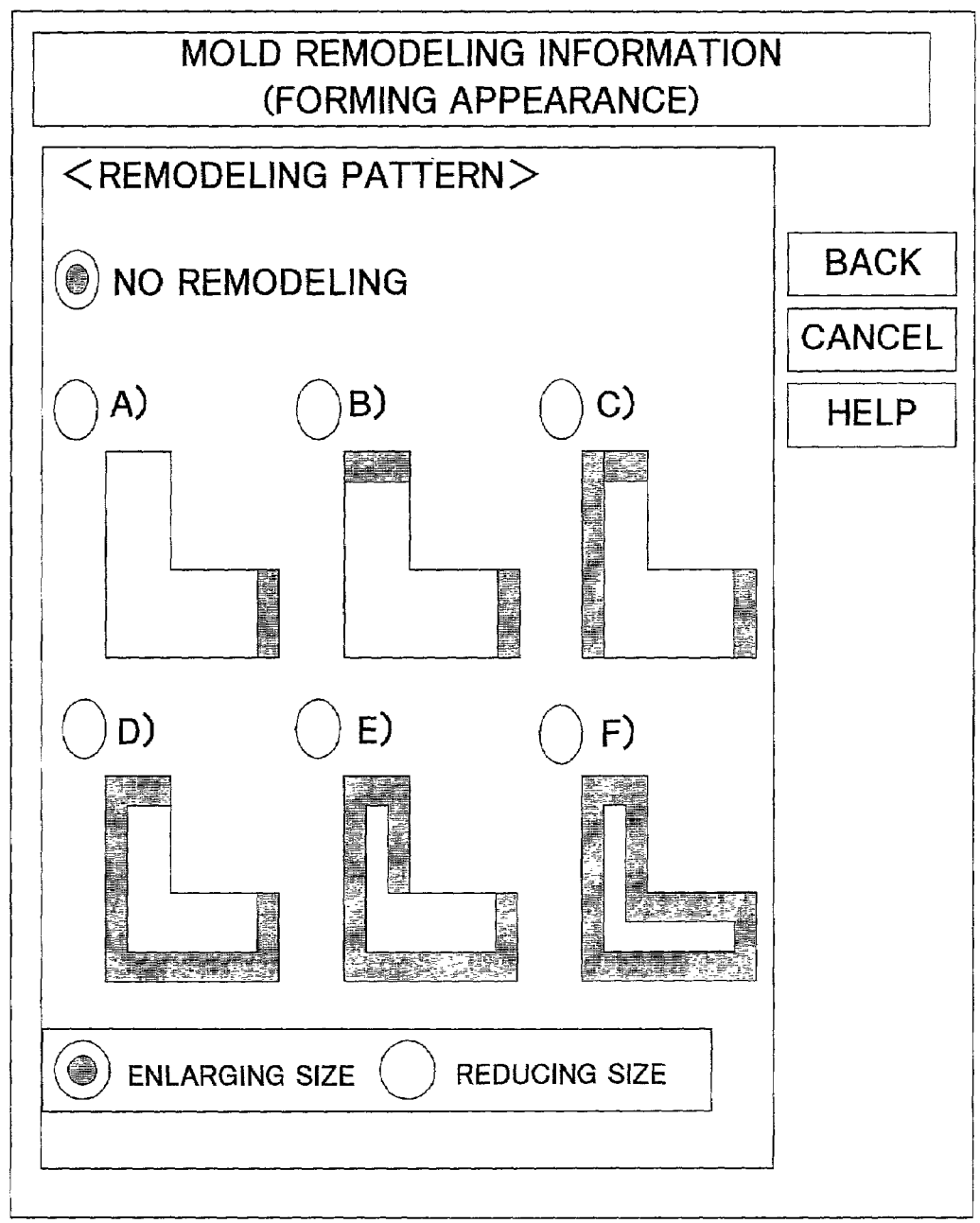
FIG. 11 is a diagram exemplifying a screen on which information on remodel of an existing mold is input.

Then, the operator inputs information regarding an existing mold which is to be used after being remodeled (step S15). In step S15, the information processing apparatus 1 displays a list of existing molds registered in the mold master file 25 in accordance with an instruction from the operator. The operator selects an arbitrary mold, and specifies contents of process methods to be applied to the selected mold. Specifically, the operator selects and enters information regarding remodeling in accordance with input guides displayed by the information processing apparatus 1 and shown in FIG. 11 to FIG. 13. The information regarding remodeling includes a kind of remodeling, a remodeling pattern, a remodeling size, etc.

After acquiring the manufacturing step information, the mold information, and the remodeling information explained above, the information processing apparatus 1 obtains unit prices of child components to be used in the respective manufacturing steps and the like from the child component unit price master file 26 if necessary (step S16).

Further, if surface treatments such as plating, coating, etc. are necessary, the operator inputs surface treatment information in accordance with an input guide displayed by the information processing apparatus 1 and shown in FIG. 14 (step S17). The surface treatment information includes a kind of a surface treatment, thickness of a film to be formed on a surface, a size of a component to which a surface treatment is applied, etc.

The information processing apparatus 1 obtains a manufacturing cost rate for each manufacturing equipment, a material management expense rate, a general management/sales expense rate, and a profit rate from the manufacturing cost rate/various expense rate master file 24. And the information processing apparatus 1 obtains information such as components forming the mold, prices of the components, a material of the mold, manufacturing equipments, manufacturing steps and the like from the mold master file 25. Then, the information processing apparatus 1 computes a component cost and a mold cost, and displays the computation results (step S18).

A computation method (a cost computation method) used in step S18 will now be explained.

First, specifications of the component cost will be explained.

The manufacturing cost is computed by multiplying the manufacturing cost rate for each of the manufacturing equipments used in the respective component manufacturing steps by a processing time, and adding up the multiplication results.

In case of a pressing process for example, the manufacturing cost is obtained by multiplying the manufacturing cost rate by a processing time set for a pressing device selected automatically for each step in the item "manufacturing step information" displayed on the initial main screen shown in FIG. 6.

The material expense is computed based on the volume and specific gravity of a material, and the unit price of the material. The material management expense is computed by multiplying the material expense by the material management expense rate.

The general management/sales expense is computed by multiplying the manufacturing cost by the general management/sales expense rate.

The profit is computed by multiplying a sum of the material management expense and the general management/sales expense by the profit rate.

The component cost is obtained by adding up the manufacturing cost, the material expense, the material management expense, the general management/sales expense, and the profit.

Next, specifications of the mold cost will be explained.

The manufacturing cost for a mold is computed based on a preparation time and a required processing time for each manufacturing equipment used in each mold manufacturing step, and the number of manufacturing steps included.

Equipments and processing times required for processing a material of the mold can be determined based on the contents of process methods to be applied to the material. The contents of the process methods to be applied to the material have been specified by referring to FIG. 9 and FIG. 10. Then, the cost required for manufacturing the mold can be computed based on the content of the process methods, and the manufacturing cost. The same applies to the case where an existing mold is remodeled.

The material expense of the mold is computed by adding up a material expense for each component forming the mold (such as a plate) and a material process cost. The mold cost for each manufacturing step is computed by adding up the manufacturing cost of the mold, the material expense of the mold, the general management/sales expense, a designing cost, a handling cost, an assembly cost, and a try adjustment cost. The total mold cost is obtained by adding up the mold costs for the respective manufacturing steps.

As described above, the material expense and the manufacturing cost (including the cost required for manufacturing itself, and the cost for the mold to be used for the manufacturing) are computed for each material to be used for manufacturing one pressed component. By computing the sum total of those costs, the total manufacturing cost of a component can be obtained.

The information processing apparatus 1 displays the computed component cost and mold cost as shown in FIG. 15 and FIG. 16, for example.

As explained with reference to the flowchart shown in FIG. 5, the operator can estimate costs of the component and the mold specifically by simply selecting and inputting each data in accordance with input guides displayed by the information processing apparatus 1.

When the operator instructs the information processing apparatus 1 to register the computation results of the cost estimation in the estimation data file 29, the information processing apparatus 1 registers the results in accordance with the instruction.

Another operator can alter his/her cost estimation process based on the registered estimation data. In this case, the registered estimation data may be acquired via a network or the like.

In order to estimate a cost of a component manufactured in China, the cost table 27 for China (or the material master file 21 to the child component unit price master file 26 for China) may be prepared to be used in the above described cost estimation process, instead of the cost table 27 for Japan (or the material master file 21 to the child component unit price master file 26 for Japan).

The cost table 27 and the like are not limited for Japanese use and Chinese use. Therefore, the cost estimation system according to the first embodiment may comprise a cost table for each region in Japan. The cost estimation system may comprise a cost table indicating costs required in a country other than Japan and China. The cost estimation system may comprise a cost table indicating costs shared among a plurality of countries. Further, the cost estimation system may comprise a seasonally changing cost table for a special component whose manufacturing cost is affected by seasonal factors.

It may be troublesome for the operator to input all information in order to estimate a component cost. To securely acquire indispensable information even in such a case, the information processing apparatus 1 may request only primary items (indispensable items) to be input, and set preset standard values for other items. In this case, the information processing apparatus 1 may compute a rough estimation for the component cost based on the acquired indispensable items and the standard values.

In the above described way, managers of a materials procurement section, a design section, etc. can objectively know the cost of a component. A manager of a materials procurement section orders a component from an order taker at a price estimated by the cost estimation system. However, the order taker may not be able to manage at the presented price, or may object to the presented price. In such a case, the manager may read the information stored in the material master file 21 to the cost guideline 28 via the information processing apparatus 1, and present the read information to the order taker. As described above, the read information is based on an actual survey, and represents figures which can be accomplished with rational efforts which could be made by companies having largest shares in the industry (or top component manufacturers having dealings with those companies). Accordingly, the presentation of the read information prompts the order taker to make efforts to accomplish the presented figures.

Further, this cost estimation system may be open for a component manufacturer or an outside supplier in order to provide them with data. Specifically, required data may be searched in accordance with a request transmitted via a network, and retrieved data may be sent back. In this way, the component manufacturer themselves may be able to overcome their weak points or to enhance their stronger points by comparing their current component cost with a cost registered in this system.

Second Embodiment

The information processing apparatus 1 having the structure shown in FIG. 1 may be structured as a client server or an ASP (Application Service Provider). And such an apparatus may be accessible by a plurality of working bodies (for example, a plurality of divisions in a company, or a plurality of companies) to share recognition about the component cost. If such a structure is available, a plurality of working bodies aiming for efficient business become able to estimate a component cost based on same standards. And communications such as negotiations can be facilitated.

Such a structure of the cost estimation system and an operation performed by this cost estimation system will be explained below.

FIG. 17 is a diagram showing the structure of the component cost estimation system according to a second embodiment of the present invention.

As shown in FIG. 17, the component cost estimation system comprises a component cost estimation site 111, groups of terminals 121 ($121_1$ to $121_m$), 131 ($131_1$ to $131_p$), and 141 ($141_1$ to $141_q$).

The component cost estimation site 111 is provided on the Internet IN. The groups of terminals 121, 131, and 141 are installed in companies sharing the component cost estimation site 111.

Specifically, the groups of terminals 121, 131, and 141 are installed in various sections requiring information on components in each of the companies. Such sections include a purchase/procurement section, a design section, a manufacturing section, a quality control section, a finance/accounting section, etc. The groups of terminals 121, 131, and 141 are connected to the Internet IN directly or indirectly. In case of indirect connection, the groups of terminals are connected to the Internet IN via a company's LAN, an Internet gateway, an access point, or the like. A WWW browser is installed in each terminal of the groups of terminals 121, 131, and 141.

Figure 18:
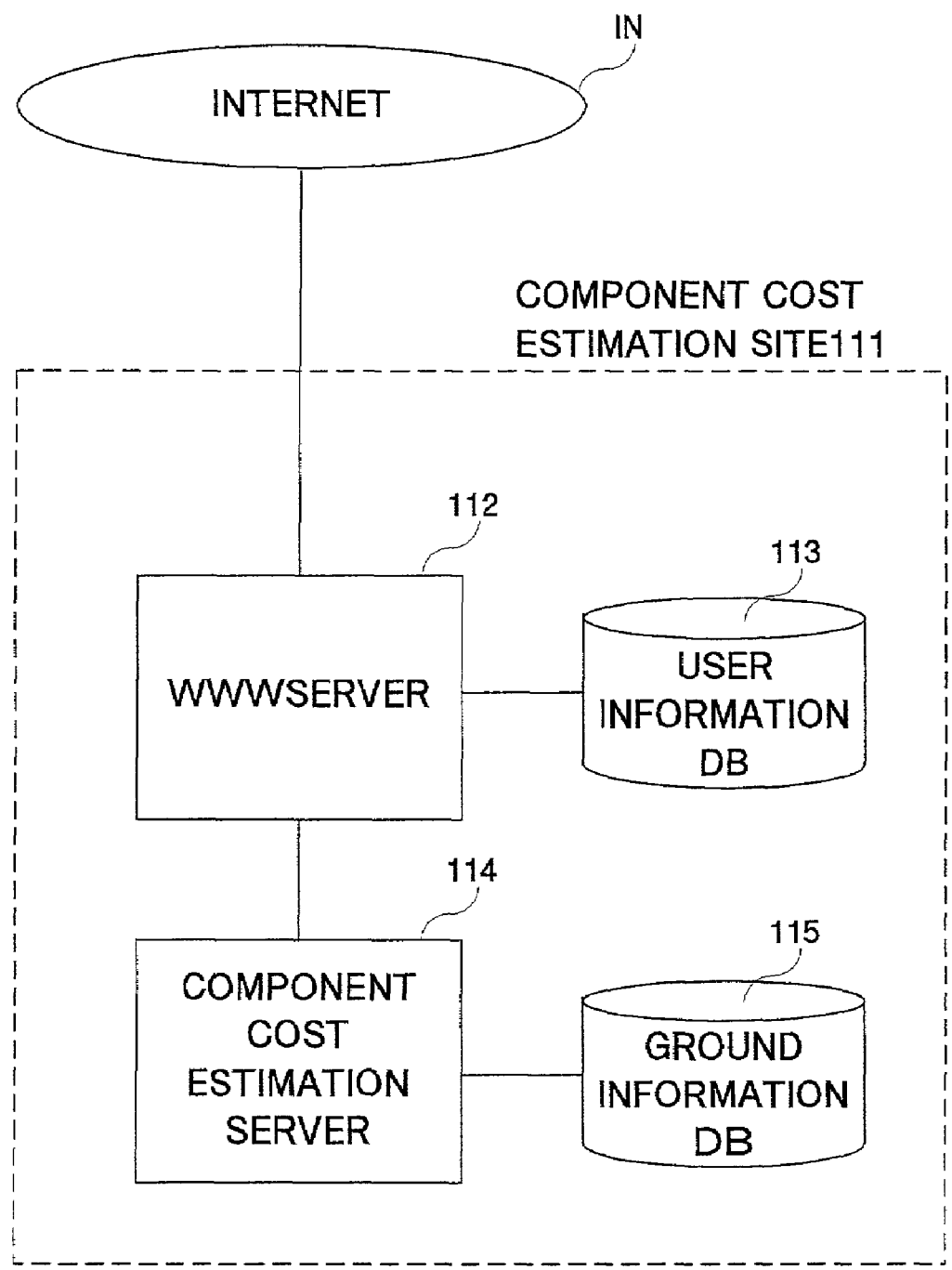
FIG. 18 is a diagram exemplifying a structure of a component cost estimation site shown in FIG. 17.

The component cost estimation site 111 provides estimation of a component cost and grounds for such estimation on demand to a request sender. As shown in FIG. 18, the component cost estimation site 111 comprises a WWW server 112, a user information DB 113, a component cost estimation server 114, and a ground information DB 115.

The WWW server 112 comprises a control unit and a storage unit which are substantially the same as those included in the information processing apparatus 1 shown in FIG. 1. The WWW server 112 receives access from each of the terminals 121, 131, and 141 via the Internet IN, and performs verification. If verification is successful, the WWW server 112 intermediates between each of the accessing terminals 121, 131, and 141 and the component cost estimation server 114 for them to communicate with each other.

The user information DB 113 comprises a hard disk device for example. The user information DB 113 stores information on a registered user who is permitted to access the component cost estimation site 111. The component cost estimation system according to the second embodiment is utilized by a group of companies who share recognition about a component cost, and have an object in common of reducing the cost while keeping the quality. Companies who agree to this object register their information. Information to be registered includes identification information (ID), a password, a company's name, a manager's name, a management section's name, a company's address, a contact method (a telephone number, a facsimile number, an email address, etc.), and the like.

The component cost estimation server 114 and the ground information DB 115 are identical to the information processing apparatus 1 and the external storage device 2, respectively. The component cost estimation server 114 and the ground information DB 115 provide estimation information and corresponding ground information in response to a request from each of the terminals 121, 131, and 141. It is preferable that information registered in the ground information DB 115 is objective data which are collected from top class companies in the industry and serve as achievement targets for the companies participating in the component cost estimation system. For example, data of companies ranking first to third among companies participating in the system may be stored in the ground information DB 115.

Functions of the WWW server 112 and component cost estimation server 114 may be performed by a single server computer. Functions of the user information DB 113 and ground information DB 115 may be performed by a single storage device. Or, storage units included in the WWW server 112 and the component cost estimation server 114 may perform the functions of the user information DB 113 and the ground information DB 115.

The operation of the component cost estimation system having the above-described structure will be explained.

[User Registration]

To use the component cost estimation system, it is necessary to be registered as a user. A company who wants to be registered in this system contacts to an administrator of the component cost estimation site 111. The administrator carries out a predetermined examination on this company. If the company passes the examination, the administrator registers information on the company in the user information DB 113. At this time, it is preferable that the administrator receives information on a component cost from the company now registered, and updates information stored in the ground information DB 115 based on the received information.

[Estimation of a Component Cost]

When utilizing a service provided by the component cost estimation site 111, a manager of a registered company accesses the WWW server 112 via an unillustrated Internet service provider (ISP) or the like using a terminal included in the groups of terminals 121, 131, and 141.

Figure 19:
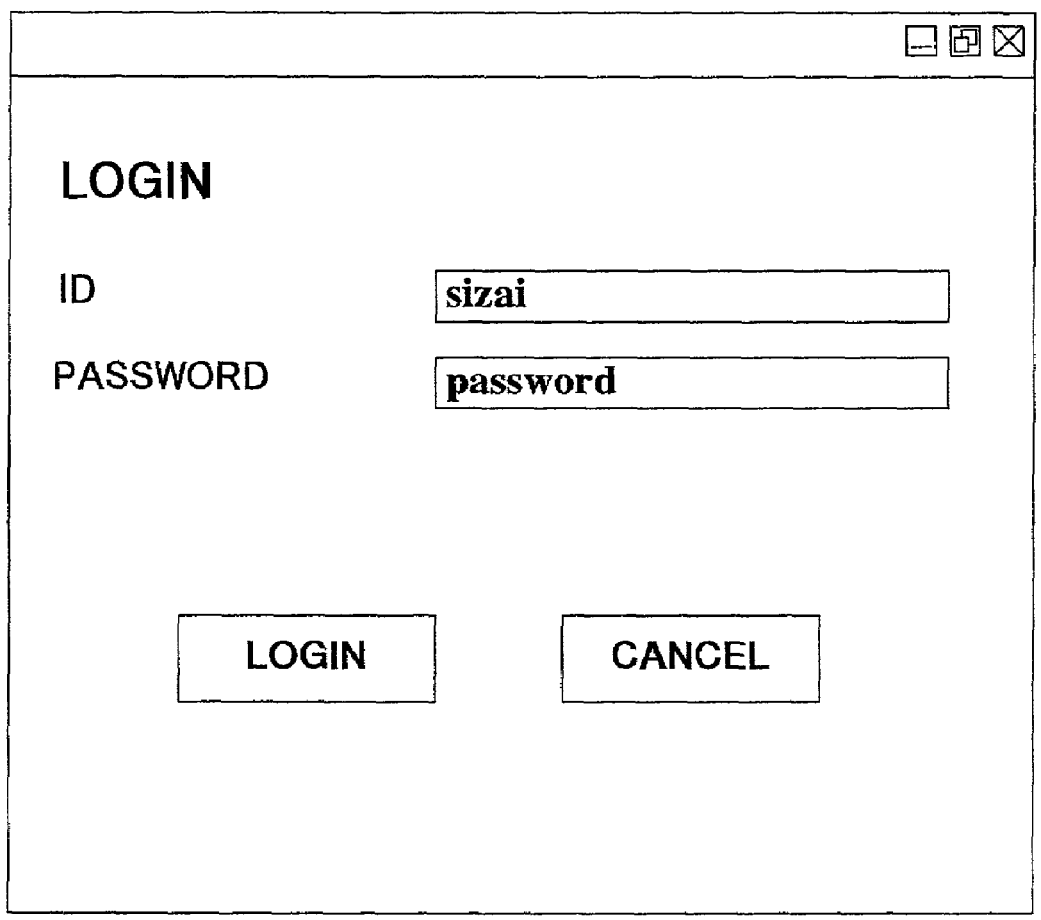
FIG. 19 is a diagram exemplifying a login screen to be displayed when the component cost estimation site is accessed.

In a case where a terminal $121_1$ is used to access the WWW server 112, the WWW server 112 sends a verification screen shown in FIG. 19 to the terminal $121_1$ in response to the access. The terminal $121_1$ displays this verification screen.

The manager of the registered company inputs the company's ID and password in this verification screen, and sends the input to the WWW server 112. The WWW server 112 determines whether the ID and password which have been sent are registered in the user information DB 113 or not. In a case where determined that the ID and password are not registered, the WWW server 112 sends an error message to the terminal $121_1$. In a case where determined that the ID and password are registered, operations for estimating a component cost and providing ground information indicative of grounds for the estimation are started in the same way as explained in the first embodiment.

According to the component cost estimation system having the above-described structure, the component cost estimation site 111 is administered by a company who procures a component from another company. On the other hand, the component cost estimation system is used by a component provider (manufacturer). If this system is operated in this way, the procuring company can communicate their requests to the component manufacturer objectively. Therefore, this system can help reduce a component cost. At the same time, the component manufacturer can objectively recognize their productive capacity and targets to be accomplished by efforts, and utilize information provided by this system as reference for improving cost performances.

Also in the component cost estimation system according to the second embodiment, data for estimation or an estimated cost may be provided via a network in response to a request from each of the terminals 121 to 141. In this way, the component manufacturer themselves may be able to overcome their weak points or to enhance their stronger points by comparing their current component cost with a cost registered in this system.

The present invention is not limited to the above embodiments, but can be applied in various forms. In the first embodiment, a pressing process which needs a mold which is normally the primary factor to give influence on a manufacturing cost is employed as an example to explain the present invention. However, the component cost estimation system of the present invention is applied to estimation of a cost of a component manufactured by a sheet metal manufacturing method, a mold manufacturing method, etc. Especially in case of a mold manufacturing method, a mold is used. Thus, the operations according to the first embodiment can be used in almost the same way.

The component cost estimation system of the present invention can be realized by a computer. For example, a recording medium (a CD-ROM, etc.) which stores a program for controlling a computer to execute the above-described cost estimation operations is prepared. If the program is installed in a computer from the recording medium, the program can provide a cost estimation function stored in a recording medium such as a hard disk of the computer or a peripheral device of the computer.

Such a program may be presented on a Bulletin Board System of a communication network to be distributed around via the communication network. Or, a carrier wave may be modulated by a signal representing the program, and an obtained modulated wave may be transmitted. An apparatus which receives the modulated wave may restore the program by demodulating the modulated wave.

As described above, according to this invention, specific estimation for a component cost and a mold cost can be obtained.

And in case of changing a design of a mold, estimation can be performed simply.

And a cost estimation system capable of estimating a cost with the use of estimation data acquired by others can be realized.

Further, data necessary for cost estimation can be obtained via a network.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-403520 filed on Dec. 28, 2000, and including specification, claims, drawings and summary. The disclosure of the above Japanese Patent Application is incorporated herein by reference in its entirety.

What is claimed is:

1. A component cost estimation system for estimating a cost of a component, said system comprising:
   a memory which stores cost information for associating a material of a component, a cost of the material, manufacturing steps of the component, and costs involved in the manufacturing steps with one another; and a computer, wherein
   said computer:
      receives data for designating a material of a component to be manufactured, and a portion of the plurality of manufacturing steps to be applied to the material;
      retrieves a cost associated with the designated material, and costs associated with the designated portion of the plurality of manufacturing steps from the cost information;
      retrieves costs associated with predetermined standard manufacturing steps which are used for the remaining portion of the plurality of manufacturing steps from the cost information; and
      generates data representing a result of estimation of a cost of the designated component based on each of the retrieved costs.

2. The component cost estimation system according to claim 1, wherein:
   the cost information includes information associating the manufacturing steps, devices used in the manufacturing steps, and costs involved in using the devices with one another,
   said computer:
      receives data for designating the material, the manufacturing steps, and the devices used in the manufacturing steps;
      retrieves costs associated with the designated material and the designated devices from the cost information; and
      determines a result of estimation based on a sum of the retrieved costs.

3. The component cost estimation system according to claim 1, wherein the cost information includes information associating the manufacturing steps and costs of child components which are the components to be used in the manufacturing steps with each other.

4. The component cost estimation system according to claim 1, wherein:
   the manufacturing steps include a pressing process;
   the cost information includes information associating a pressing device to be used in the pressing process and a cost involved in using the pressing device with each other; and
   said computer:
      receives data for designating the pressing process, a material to which the pressing process is applied, and the pressing device to be used in the pressing process;
      retrieves costs associated with the designated material and the designated pressing device from the cost information; and
      determines a result of estimation based on a sum of the retrieved costs.

5. The component cost estimation system according to claim 4, wherein said computer obtains costs of molds to be used in steps included in the pressing process, and uses the obtained costs as costs retrieved from the cost information.

6. The component cost estimation system according to claim 5, wherein said computer obtains the costs of the molds which are to be used in the respective steps included in the pressing process, and which are either newly manufactured, or manufactured by remodeling an existing mold.

7. The component cost estimation system according to claim 1, further comprising a reception server which receives an access from outside via a network, and sends the data representing the result of estimation of the cost of the component obtained by said computer to an accesser.

8. A component cost estimation system which receives accesses from a plurality of working bodies via a network, and estimates a cost of a component, said system comprising:
   a memory which stores cost information for associating a material of a component to be manufactured, a cost of the material, manufacturing steps to be applied to the material, and costs involved in the manufacturing steps with one another;
   a reception server which receives designation data for designating the material of the component and a portion of the plurality of manufacturing steps to be applied to the material from the working bodies who request an estimation via said network; and
   an estimation computer,
   wherein said estimation computer:
      retrieves costs associated with the material and the portion of the plurality of manufacturing steps designated by the designation data received by said reception server from the cost information;
      retrieves costs associated with predetermined standard manufacturing steps which are used for the remaining portion of the plurality of manufacturing steps from the cost information;
      generates estimation result data representing a result of estimation of a cost of the component based on the retrieved costs; and
      sends the estimation result data to the working bodies who have requested the estimation via said network.

9. The component cost estimation system according to claim 8, wherein:
   said reception server receives a browsing request for browsing a content of the cost information; and
   said estimation computer sends the content of the cost information to a sender of the browsing request via said network in response to the browsing request received by said reception server.

10. The component cost estimation system according to claim 8, further comprising a verification data memory which stores verification data for verifying the working bodies who request an estimation,
   wherein said reception server:
   receives verification data sent from the working bodies via said network; and
   determines whether or not to receive the designation data from the working bodies based on the verification data sent from the working bodies and the verification data stored in said verification data memory, and refuses to receive the designation data when determined not to receive the designation data.

11. The component cost estimation system according to claim 8, wherein the cost information is made up of information obtained based on a cost of a component provided by a provider selected according to a predetermined standard from among a plurality of providers who provide substantially the same component.

12. A component cost estimation method for estimating a cost of a component, comprising:
- storing cost information for associating a material of a component, a cost of the material, manufacturing steps of the component, and costs involved in the manufacturing steps;
- receiving data for designating a material of a component to be manufactured, and a portion of the plurality of manufacturing steps to be applied to the designated material;
- retrieving a cost associated with the designated material, and costs associated with the designated portion of the plurality of manufacturing steps from the cost information;
- retrieving costs associated with predetermined standard manufacturing steps which are used for the remaining portion of the plurality of manufacturing steps from the cost information; and
- generating data representing a result of estimation of a cost of the component based on the retrieved costs.

13. A component cost estimation method for receiving accesses from a plurality of working bodies via a network, and estimating a cost of a component, said method comprising:
- storing cost information for associating a material of a component to be manufactured, a cost of the material, manufacturing steps to be applied to the material, and costs involved in the manufacturing steps with one another;
- receiving designation data for designating the material of the component and a portion of the plurality of manufacturing steps to be applied to the material from the working bodies who request an estimation via said network;
- retrieving costs associated with the material and the portion of the plurality of manufacturing steps designated by the received designation data from the cost information;
- retrieving costs associated with predetermined standard manufacturing steps which are used for the remaining portion of the plurality of manufacturing steps from the cost information; and
- generating estimation result data representing a result of estimation of a cost of the component based on the retrieved costs; and
- sending the estimation result data to the working bodies who have requested the estimation via said network.

14. A computer-readable recording medium which stores a program for controlling a computer, which is connected to a memory for storing cost information associating a material of a component, a cost of the material, manufacturing steps of the component, and costs involved in the manufacturing steps with one another, to perform:
- receiving data for designating a material of a component to be manufactured and a portion of the plurality of manufacturing steps to be applied to the material;
- retrieving a cost associated with the designated material, and costs associated with the designated portion of the plurality of manufacturing steps from the cost information;
- retrieving costs associated with predetermined standard manufacturing steps which are used for the remaining portion of the plurality of manufacturing steps from the cost information; and
- generating data representing a result of estimation of a cost of the component based on the retrieved costs.

15. A computer-readable recording medium which stores a program for controlling a computer, which is connected to a reception server for receiving designation data for designating a material of a component to be manufactured and a portion of a plurality of manufacturing steps to be applied to the material from a plurality of working bodies who request an estimation via a network, and is also connected to a memory for storing cost information for associating a material of a component, a cost of the material, manufacturing steps of the component, and costs involved in the manufacturing steps with one another, to perform:
- retrieving costs associated with the material and the portion of the plurality of manufacturing steps designated by the designation data received by said reception server from the cost information;
- retrieving costs associated with predetermined standard manufacturing steps which are used for the remaining portion of the plurality of manufacturing steps from the cost information; and
- generating estimation result data representing a result of estimation of a cost of the component based on the retrieved costs; and
- sending the estimation result data to the working bodies who have requested the estimation via said network.

16. The component cost estimation system according to claim 1, wherein:
- said memory stores the cost information associated with each region engaging in manufacturing the component;
- said computer:
- receives data for designating a region engaging in manufacturing the component; and
- determines a result of estimation of the cost of the component based on costs retrieved from the cost information associated with the designated region.

* * * * *